July 10, 1962 C. P. KOLTHOFF, JR 3,043,568
REGENERATOR DRIVE AND SUPPORTING ARRANGEMENT
Filed Feb. 26, 1959 5 Sheets-Sheet 5
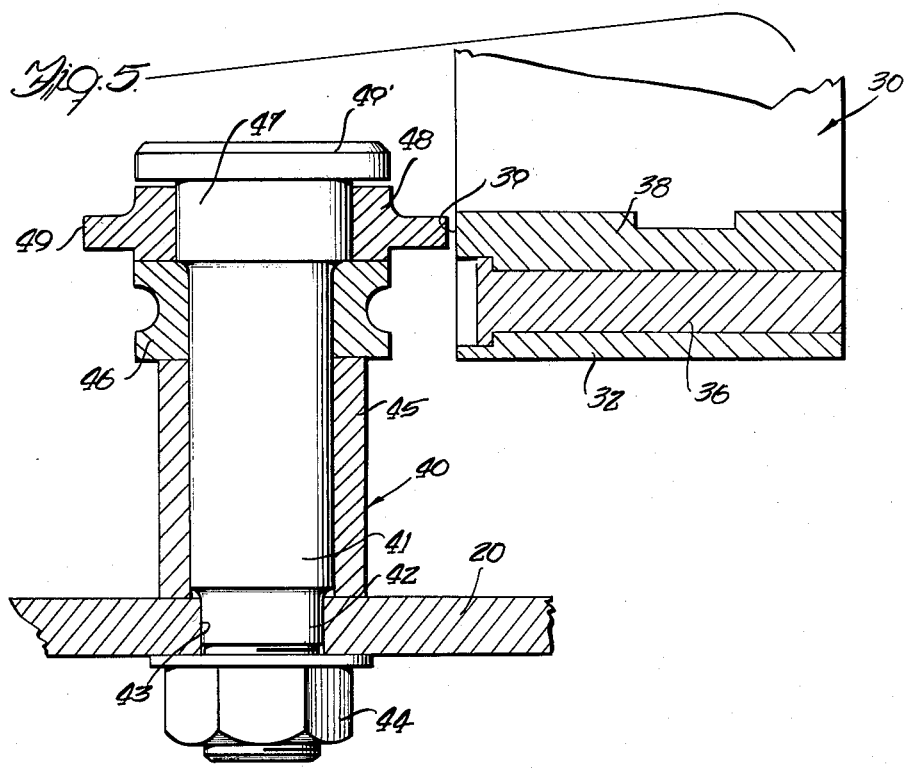
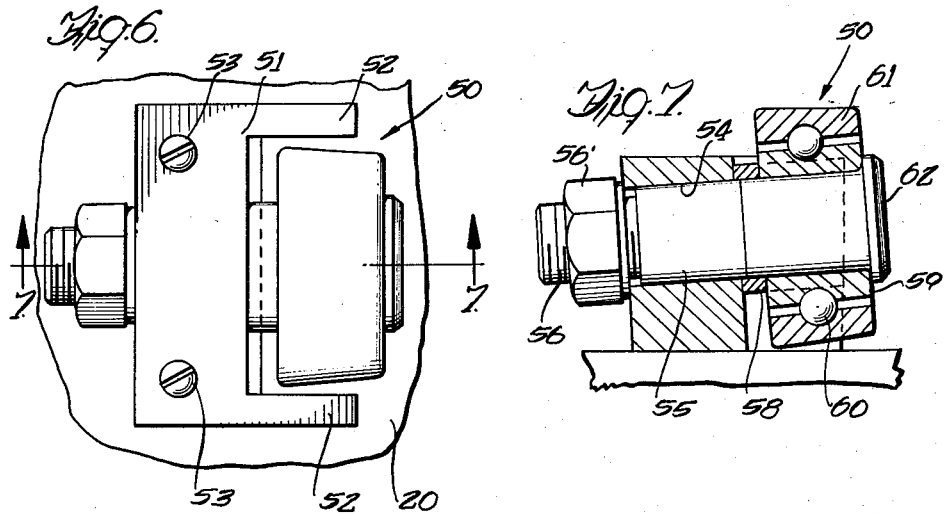
INVENTOR
C. PAUL KOLTHOFF, JR.
ATTORNEY

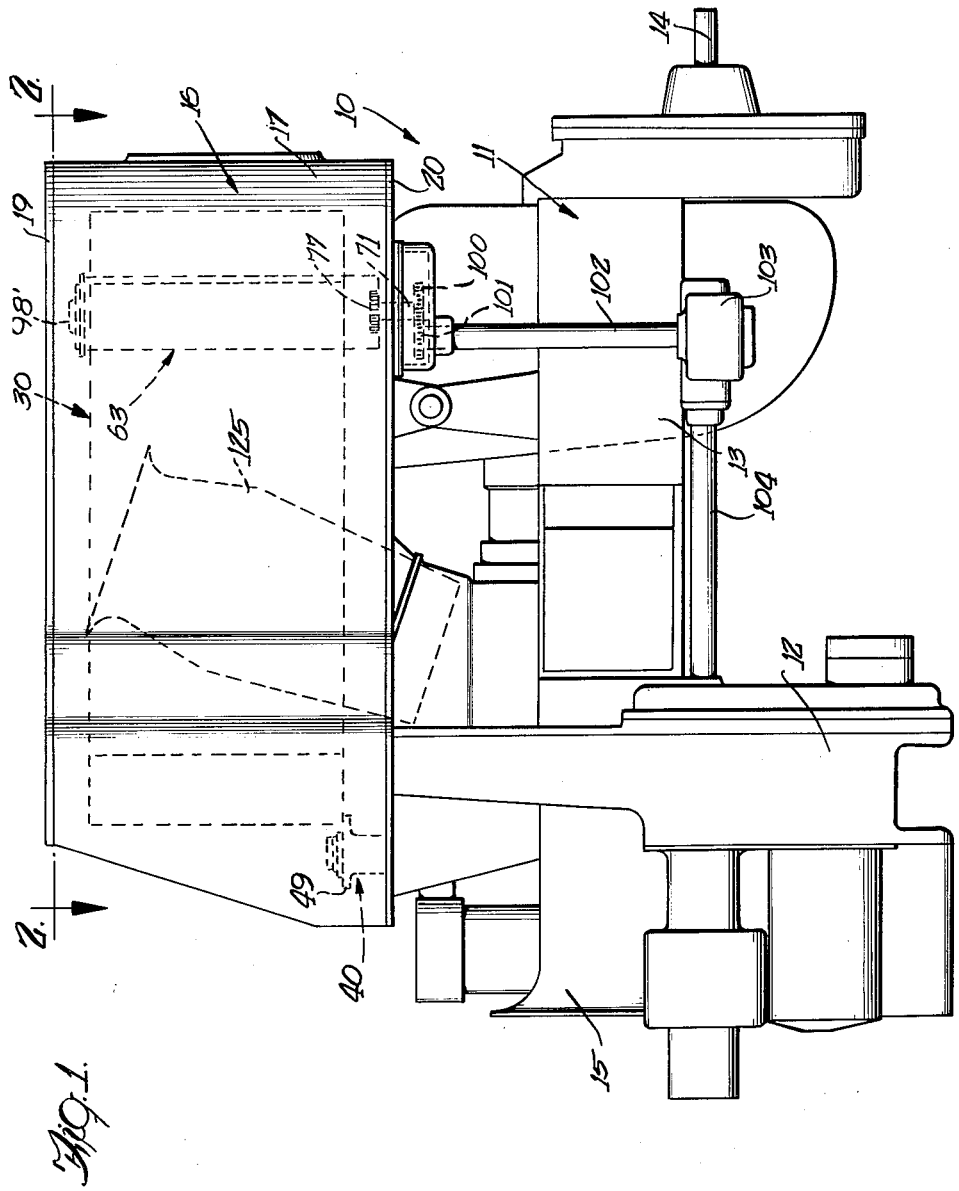

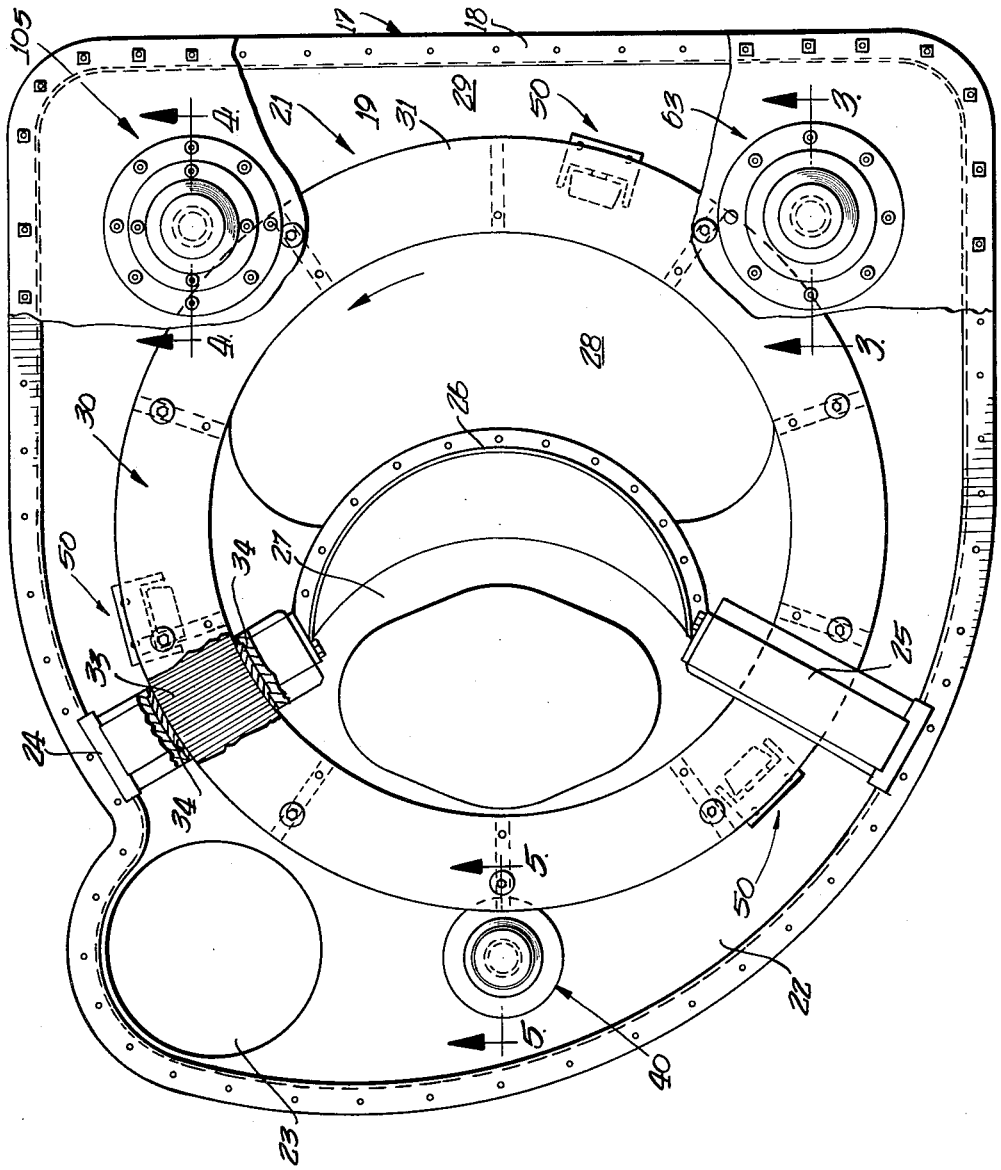

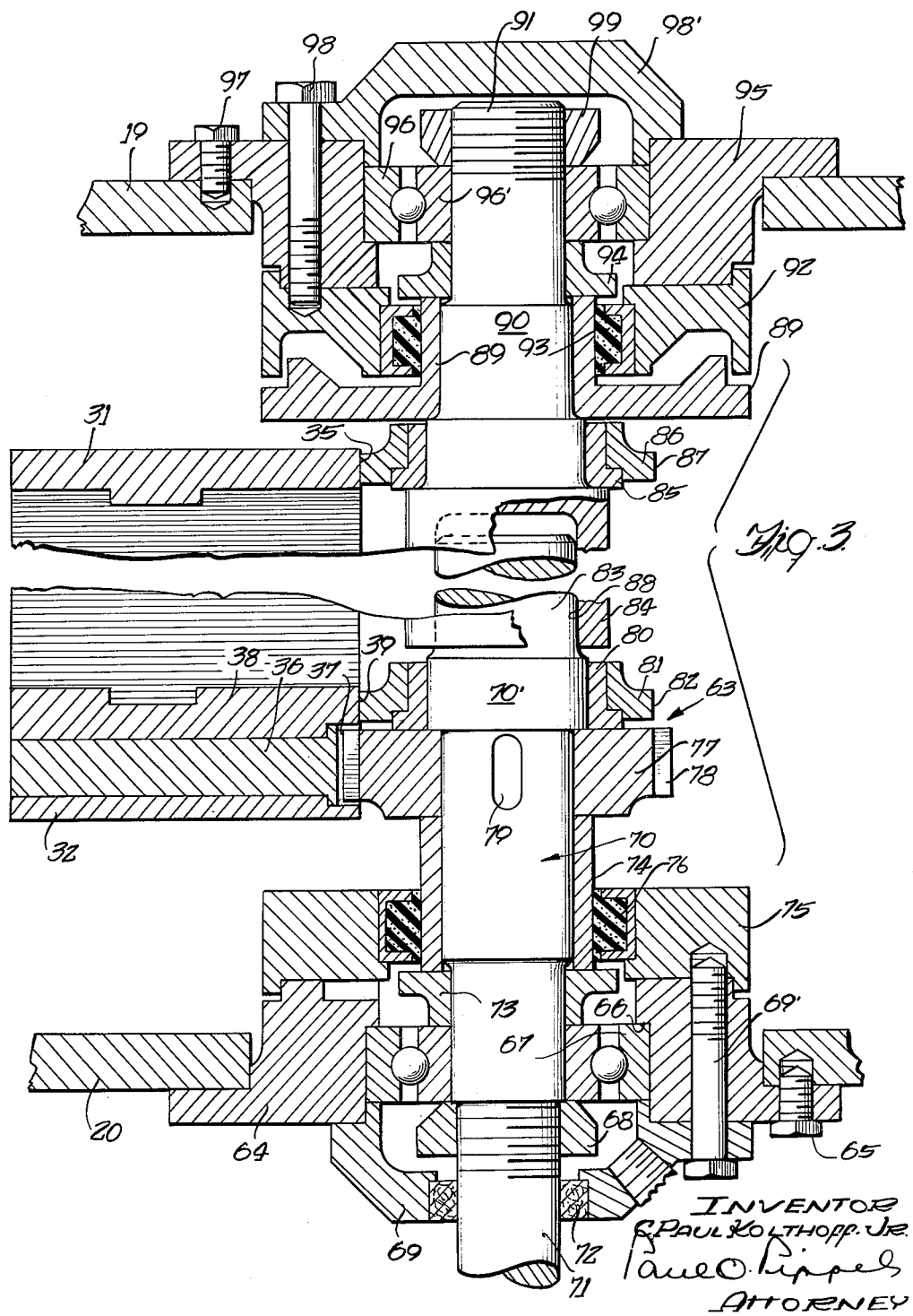

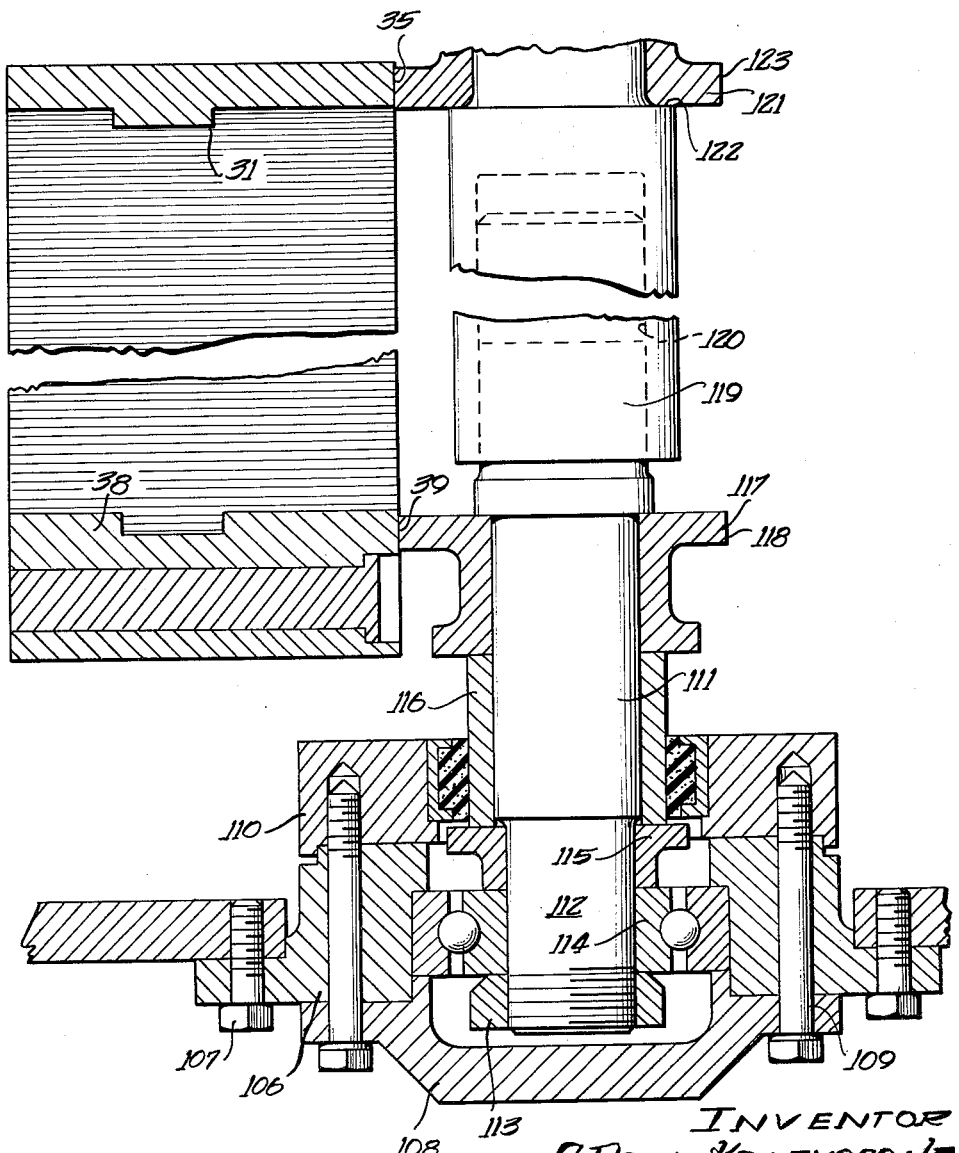

United States Patent Office 3,043,568
Patented July 10, 1962

3,043,568
REGENERATOR DRIVE AND SUPPORTING ARRANGEMENT
C Paul Kolthoff, Jr., Naperville, Ill., assignor to International Harvester Company, Chicago, Ill., a corporation of New Jersey
Filed Feb. 26, 1959, Ser. No. 795,814
6 Claims. (Cl. 257—267)

This invention relates to heat regenerators generally used in connection with gas turbine engines. More specifically, the invention relates to a rotary regenerator having an improved driving ararngement and support construction.

In the construction and use of a gas turbine engine the regenerator plays an important part. The purpose of the regenerator is to utilize the exhaust gases from the turbine in the heating of air which is delivered from the compressor unit to the combustor of the gas turbine. Thus by the preheating of the incoming air the efficiency of the gas turbine is greatly improved. Regenerators conventional in the art today usually consist of the stationary heat exchange unit or the rotary type of regenerator, the latter being the type to which the present invention pertains.

In a rotary regenerator construction a cylindrical matrix is rotated about its axis, the said matrix generally consisting of a plurality of heat exchange members and passages which are moved into the hot exhaust chamber of the regenerator and which, upon rotation, are moved into the compressed air chamber wherein the compressed air is heated prior to its delivery to the combustor unit. As the regenerator matrix is moved from one chamber to another the adjacent chambers must be sealed and therefore various types of seal designs have been developed. It is a prime object of the present invention to provide an improved supporting ararngement for a rotary regenerator, the said supporting arrangement being coordinated with the regenerator seals to provide an efficiently operating unit.

Still a further object is the provision of an improved drive arrangement for driving a rotary regenerator from the power take-off of a gas turbine.

A still further object is to provide an improved supporting and bearing arrangement for a rotatable type matrix of a rotary regenerator.

Still another object is to provide a three-point supporting arrangement for the matrix of a rotary regenerator, the said arrangement supporting said matrix against movement in a regenerator casing.

Still another more specific object is to provide a three-point supporting arrangement for supporting the cylindrical matrix of a regenerator, one of the supports including a driving arrangement for rotating the said regenerator.

Still another object is the provision of a supporting structure for supporting a rotatable regenerator matrix in position with respect to a pair of regenerator seals, the supporting arrangement including a bearing support arrangement for supporting the matrix for rotating movement, and including a plurality of supports spaced about the periphery of the regenerator matrix to support the said matrix against lateral displacement with respect to the sealing elements of the regenerator.

Still another object of this invention is to provide an improved supporting and drive arrangement for a rotatable matrix of a rotary regenerator, said supporting and drive arrangement including adjustable supporting elements which automatically compensate for expansion and contraction of the structure due to changes of temperature within the regenerator casing.

These and other objects of the invention will become more apparent from a reading of the description when examined in connection with the accompanying sheets of drawings.

In the drawings:
FIG. 1 is a side elevational view of a gas turbine engine having a regenerator casing positioned thereon;
FIG. 2 is an enlarged cross-sectional view taken substantially along the line 2—2 of FIG. 1;
FIG. 3 is an enlarged cross-sectional view through a support and regenerator drive taken substantially along the line 3—3 of FIG. 2;
FIG. 4 is a partial cross-sectional view of a support taken substantially along the line 4—4 of FIG. 2;
FIG. 5 is an enlarged cross-sectional view through a support for a regenerator matrix, the said view being taken along the line 5—5 of FIG. 2;
FIG. 6 is a fragmentary view of a bearing support and bearing for supporting a regenerator matrix within a regenerator casing; and
FIG. 7 is a cross-sectional view taken substantially along the line 7—7 of FIG. 6.

Referring now particularly to FIG. 1, a gas turbine and regenerator assembly is generally designated by the reference character 10. The assembly 10 comprises a gas turbine generally designated 11, the said turbine 11 having a compressor casing 12 and a turbine casing 13. The gas turbine 10 will be described only generally. A power output shaft 14 projects from the turbine casing 13, the said power output shaft 14, being rotated by a turbine wheel (not shown) within the turbine casing 13. The compressor casing 12 comprises a compressor inlet 15 which, as in conventional turbines, draws air into the compressor casing as a result of operation of the compressor (not shown). A regeneraotr 16 is positioned on top of the turbine 11. The regenerator 16 comprises a casing 17 having a top wall 19 and bottom wall 20. As shown in FIG. 2, the casing 17 also consists of a peripheral wall 18. The interior of the casing 17 is provided with a regenerator chamber generally designated at 21. The regenerator chamber 21 is divided into an air chamber 22 having an air inlet 23. Seal boxes 24 and 25 are positioned in spaced relation within the chamber 21 and a wall 26 connects the seal boxes 24 and 25 to provide a combustor chamber 27. Similarly the seal boxes 24 and 25 separate an exhaust chamber 28 and an outlet chamber 29 from the air chamber 22.

A regeneraor drum is designated at 30, the said regenerator drum 30 having a cylindrical construction including an upper wall 31, a lower wall 32 and a heat exchange matrix 33. The regenerator matrix 33 will not be described in detail since a conventional type of matrix arrangement may be utilized. In the present instances the matrix includes a heat exchange structure including a plurality of passages which permit air from the chamber 22 to be delivered to the combustor chamber 27 and gas to be delivered from the exhaust chamber 28 to the outlet chamber 29. Each of the seal boxes 24 and 25 includes a set of seal shoes 34 which engage in sealing relation the outer and inner circumferential walls and top and bottom walls of the regenerator drum 30. The seal shoes 34 are flexibly urged against the matrix 33 in floating arrangement by a flexible support means (not shown). As shown in FIG. 3 the regenerator drum 30 also includes an upper outer peripheral bearing surface 35 formed on the upper wall 31. The wall 32 has suitably connected thereto a ring type gear 36 having a plurality of gear teeth 37. The wall 32 also includes a flat annular wall portion 38 positioned adjacent to the ring gear 36. The wall portion 38, like the wall 31, includes a lower outer peripheral bearing surface 39.

As best shown in FIG. 2, the matrix 30 is adapted to rotate about its axis with the said matrix moving through the seal boxes 24 and 25 during its rotation. In order to support the matrix against extreme relative lateral movement with respect to the seal boxes 24 and 25 a front support spindle generally designated at 40 is provided. As shown in FIGURE 5 the front support spindle 40 comprises a vertical shaft 41 having a reduced neck 42 which projects downwardly through an opening 43 in the wall 20. The shaft 41 is rigidly secured to the wall 20 by means of a nut 44 in threaded engagement with the reduced neck 42. A sleeve 45 is provided on the shaft 41 and a spacer 46 is seated upon the sleeve 45. A bearing surface 47 is provided at the upper end of the shaft 41, the said bearing surface 47 having positioned for rotation thereon, a bearing member 48 having an outer engaging surface 49 which, as indicated in FIG. 5, is adapted to engage the lower outer peripheral bearing surface 39 to restrain the regenerator drum 30 against lateral movement in a direction to the left as indicated in FIG. 2. The upper end of the shaft 41 is provided with a head 49' to suitably retain the bearing member 48 against upward displacement.

The matrix 30 is rotatably supported on the wall 20 by means of three bearing assemblies each of which is generally designated at 50 as best shown in FIGS. 2, 6 and 7. Each bearing assembly 50 comprises a support block 51 having laterally spaced parallel legs 52, the said block 51 being fastened to the wall 20 by means of screws 53. As best shown in FIG. 7, the block 51 is provided with a bore 54 in which a stud 55 is positioned. The stud 55 has a threaded portion 56 and a nut 56' securely locks the stud 55 onto the block 51. A spacer 58 is provided on the stud 55 and an inner bearing member 59 is supported on the end of the stud 55. The bearing member 59 rotatably supports a plurality of balls 60 disposed between the bearing member 59 and an outer race or bearing member 61. A head 62 is provided on the end of the stud 55 for securely locking the parts in the assembly. The outer bearing race 61 engages the underneath side of the wall 32 of the matrix 30 and thus the matrix 30 is suitably supported on the three bearing members 50 which are supported on the wall 20.

Referring now particularly to FIGS. 2 and 3, a support and drive member is generally designated at 63. A support plate 64 is suitably connected to the bottom wall 20 by means of screws 65, only one of which is shown. The plate 64 includes a shoulder 66 against which a ball bearing assembly 67 is positioned. A nut 68 securely locks the assembly 67 in position. A cap 69 is suitably secured to the plate 64 by means of screws 69'. A vertical shaft 70 includes a projecting shaft extension 71 which is suitably threaded to receive the nut 68, and a packing seal 72 on the cap 69 engages the extension 71. A spacer 73 is positioned above the bearing assembly 67, the spacer 73 encircling the shaft 70 and supporting a sleeve 74. A ring plate 75 is seated on the plate 64 and is suitably connected thereto by means of the screws 69'. A suitable seal 76 carried by the plate 75 engages the sleeve 74. A gear 77 having a plurality of teeth 78 is keyed to the shaft 70 by means of a suitable key 79 extending through the shaft 70. The teeth 77, as best shown in FIG. 3, engage the teeth 37 of the ring gear 36 in driving relation. A sleeve 80 encircles an enlarged portion 70' of the shaft 70. The sleeve 80 supports for rotation a bearing member 81 having an outer peripheral bearing edge 82 and is adapted to engage, as shown in FIG. 3, the peripheral surface 39 of the member 38. The upper end of the shaft 70 is provided with an extension 83. A tubular shaft is designated at 84, the said tubular shaft being supported within a sleeve 85. The sleeve 85 is mounted for rotation with the shaft 84 and has provided thereon a bearing 86 having an outer engaging edge 87 adapted to engage the peripheral surface 35 as best shown in FIG. 3. The tubular shaft 84 is provided with an inner cylindrical wall which is engaged by the extension 83 in relative telescoping relation. A spacer plate 89 encircles a reduced diameter portion 90 of the portion 90. The shaft 84 is also provided at its upper end with a threaded portion 91. A seal support 92 is positioned above the spacer 89, the seal support 92 supporting a seal 93 engaging a peripheral surface of the spacer 89. A spacer element 94 encircles the threaded portion 91. A bearing support 95 is suitably positioned to support a bearing assembly 96, the said support 95 being secured to the wall 19 by means of screws 97. A screw 98 suitably connects a cap 98' to the bearing support 95. The tubular shaft 84 is adapted to rotate within the bearing 96 and the nut 99 tightly engages an inner race 96' of the bearing assembly 96 to secure the same to the threaded extension 91.

Referring now particularly to FIG. 1, the extension 71 is connected at its bottom to a gear 100 which meshes with a gear 101 rigidly secured to a rotatable shaft 102. The shaft 102 projects into a gear box 103 wherein suitable gearing (not shown) rotates the said shaft 102. A driven shaft 104 is connected to a driving arrangement (not shown) disposed in the compressor casing 12.

Referring now to FIGURES 2 and 4, a support generally is designated by the reference character 105. The support 105, with the supports 40 and 63 provide a three-point support to restrain the regenerator matrix against excessive lateral movement with respect to the seal boxes 24 and 25. The support 105 includes a support plate 106 suitably connected to the bottom wall 19 by means of a plurality of screws 107. A cap 108 is suitably connected by means of a screw 109 to a retainer 110 and to the plate 106. A vertical shaft 111 has at its lower end a threaded extension 112 suitably connected by means of a nut 113 to the inner portion of a bearing assembly 114. Thus the shaft 111 is positioned for rotation on the bearing 114, the said bearing 114 being suitably retained within the plate 106 by means of a cap 108. A spacer 115 is positioned above the bearing assembly 114, the said spacer supporting a sleeve 116 which in turn supports a bearing element 117, the said bearing element 117 being rotatable with the shaft 111 and including an outer bearing edge 118 which is adapted to engage the peripheral surface 39 of the member 38, as shown in FIG. 4. A vertically disposed tubular member 119 includes a cylindrical bore 120 which engages the shaft 111 in telescoping or mating relation. A bearing member 121 is supported on the tubular member 119, the said bearing member 121 being retained on said tubular member 119 by means of a shoulder 122. The bearing member 121 includes a bearing surface 123 which engages the peripheral surface 35 of the upper wall 131. The shaft 119 is supported identically on the top wall 19 in the same manner as shown in FIG. 3 wherein the top support for the shaft 84 is disclosed. Therefore, since the support is identical it will not again be illustrated and described.

*Operation*

The operation of the gas turbine and the regenerator will not be described in detail. It is believed to be sufficient to indicate that air under high pressure is delivered from the inlet 23 to the inlet chamber 22. This air under pressure is forced through the matrix passages 33 of the regenerator drum 30 into the combustor chamber 27 whereupon it is delivered to the gas turbine by means of the combustor generally designated by the reference character 125 in FIG. 1. The exhaust gases from the turbine are delivered to the chamber 28 and from this chamber these gases pass through the matrix portion of the regenerator drum 30 which happens to be in the chamber at that time. These exhaust gases are then delivered to the exhaust chamber 29 and from thereon to the atmosphere. As the drum 30 is rotated the heated portions of the matrix pass into the air chamber 22 whereupon the compressed air as it is forced through the passages 33 is preheated thereby increasing the efficiency of the operation. The seal shoes 34 suitably seal one chamber from the other at the points wherein the matrix surfaces move from one chamber to another. The three bearing members shown in FIGS. 2 and 6 and designated at 50 engage the underneath wall 32 of the regenerator drum to support the same vertically within the casing. Thus the drum is free to roll about its axis on the bearing members 61. Thus a three-point suspension is provided. The supports 40, 63 and 105 also provide a three-way support to prevent the drum 30 from shifting laterally within the casing, which of course would be damaging to the seals 34. Thus the support 40 prevents the drum 30 from moving to the left in FIG. 2 and the supports 105 and 63 prevent the drum from moving to the right in FIG. 2. The three-way supporting arrangement about the peripheral portion of the drum 30 prevents any other lateral movement which might be occasioned during operation of the unit. However, the drum 30 is thus free to float or rotate within the casing. As indicated in FIGS. 3, 4 and 5, the bearing members 86, 121, and 49, 81, 117 are adapted to respectively engage the surfaces 35 and 39 of the drum to permit free rotation of the drum but also to restrain the same against any lateral movement. As shown in FIG. 5 however, sufficient clearance is provided between the bearing 49 and the surface 39, so as to compensate for expansion of the drum due to heat to which it is subjected.

As the shaft 102 is rotated the gear 101 drives the gear 100, in turn rotating the gear 77 of the drive support member 63. As the shaft 70 is rotated the gear 77 by its engagement of the teeth 78 with the ring gear 36 causes rotation of the drum about its axis. Thus effective positive drive of the drum is assured from the support arrangement 63 while still maintaining adequate support. The bearing members 48, 81, 86, 117 and 121 effectively retain the drum against lateral displacement.

Since the matrix passes from a cooler chamber to a hotter chamber and vice versa the matrix of course expands and contracts accordingly. By the arrangement shown this expansion and contraction takes place without interference with the operation or driving arrangement. The floating and three-point suspension of the drum permits the thermal adjustments of the metal without causing interruption of the positive drive. Thus the matrix can grow or shrink accordingly and still positive drive is effected. At the same time the matrix is adequately supported against lateral movement. Furthermore, the casing itself will shrink and contract so that the walls 19 and walls 20 may move relatively in a vertical direction with respect to each other. The supports 63 and 105 are connected to both of the aforementioned walls and to permit relative vertical expansion and contraction to take place the tubular shafts 84 and 119 and their telescoping engagement with the shafts 70 and 111 permits such relative movement of the said walls 19 and 20 without interruption of the effective driving arrangement and support arrangement for the regenerator drum. The tubular shafts 84 and 119 are free to rotate with the shafts 70 and 111 as indicated by the structure described above.

Thus it is obvious that an effective three-point roller arrangement has been provided to support the drum wherein the drum can float freely and rotate effectively. Furthermore, the drum is restrained against excessive lateral movement by means of the three-point supporting arrangements 40, 63 and 105. Thus expansion and contraction of the matrix is adequately compensated for and an effective drive and supporting arrangement has been disclosed.

Thus the objects of the invention have been fully achieved and it must be understood that changes and modifications may be made without departing from the spirit of the invention as disclosed or the scope thereof as defined in the appended claims.

What is claimed is:

1. A heat regenerator comprising a casing including outer, upper and lower walls, a rotatable regenerator matrix disposed within said casing, said matrix including a cylindrical permeable member having annular top and bottom walls and outer and inner peripheral walls, first and second sealing assemblies within said casing, a transversely extending partition wall connected to said sealing assemblies to divide said casing into chambers, said assemblies including passages through which said matrix is moved during rotation from one chamber to another, said top and bottom walls of said matrix including axially extending peripheral bearing surfaces, a driven gear on said matrix, said driven gear having circumferentially spaced teeth, means supporting said matrix including a plurality of bearing elements mounted on said lower wall, said bearing elements including roller means engaging said bottom wall of said matrix, first, second, and third supports within said casing, said supports being positioned in triangular fashion about and outwardly of said outer wall of said matrix, said first support including an upright spindle supported on the lower wall, a bearing member rotatably mounted on said spindle and being adapted to engage the peripheral bearing surface of said bottom wall in bearing relation; said second and third supports each including an upright shaft, means rotatably supporting said upright shafts on said lower wall, a bearing member on each of said shafts and adapted to engage the peripheral bearing surface of said bottom wall, elongated tubular members rotatably supported on said upper wall, said shafs being slidably positioned in telescoping relation within said tubular members, a bearing member connected for rotation with each said tubular members, said bearing members engaging said top wall bearing surface in bearing relation, any pair of said adjacent supports being positioned substantially less than 180° apart whereby said matrix is supported against endwise displacement, and a pinion connected to rotate with one of said shafts, said pinion engaging said gear teeth in driving relation, and driving means for rotating said last mentioned shaft thereby rotating said matrix.

2. A heat regenerator comprising a casing including outer, upper and lower walls, a rotatable regenerator matrix disposed within said casing, said matrix including a cylindrical permeable member having annular top and bottom walls and outer and inner peripheral walls, first and second sealing assemblies within said casing, a transversely extending partition wall connected to said sealing assemblies to divide said casing into chambers, said assemblies including passages through which said matrix is moved during rotation from one chamber to another, said top and bottom walls of said matrix including axially extending peripheral bearing surfaces, a driven gear on said matrix, said driven gear having circumferentially spaced teeth, means supporting said matrix including a plurality of bearing elements mounted on said lower wall, said bearing elements including means engaging said bottom wall of said matrix, first, second, and third supports within said casing, said supports being positioned outwardly of said outer wall of said matrix, said first support including an upright spindle supported on the lower wall, a bearing member rotatably mounted on said spindle and being adapted to engage the peripheral bearing surface of said bottom wall in bearing relation, said second and third supports each including an upright shaft, means rotatably supporting said upright shafts on said lower wall, a bearing member on each of said shafts and adapted to engage the peripheral bearing surface of said bottom wall, elongated tubular members rotatably supported on said upper wall, said shafts being slidably positioned in telescoping relation within said tubular members, a bearing member connected for rotation with each said tubular member, said bearing members engaging said top wall bearing surface in bearing relation, any pair of said adjacent supports being positioned substantially less than 180° apart whereby said matrix is supported against endwise displacement, and a pinion connected to rotate with one of said shafts, said pinion engaging said gear teeth in driving relation, and driving means for rotating said latter shaft thereby rotating said matrix.

3. A heat regenerator comprising a casing including outer, upper and lower walls, a rotatable regenerator matrix disposed within said casing, said matrix including a cylindrical member having annular top and bottom walls and outer and inner peripheral walls, first and second sealing assemblies within said casing, a transversely extending partition wall connected to said sealing assemblies to divide said casing into chambers, said assemblies including passages through which said matrix is moved during rotation from one chamber to another, said top and bottom walls of said matrix including peripheral bearing surfaces, a driven gear on said matrix, said driven gear having circumferentially spaced teeth, means supporting said matrix including a plurality of bearing elements mounted on said lower wall, said bearing elements including means engaging said bottom wall of said matrix, first, second, and third supports within said casing, said supports being positioned outwardly of said outer wall of said matrix, said first support including an upright spindle supported on the lower wall, a bearing member rotatably mounted on said spindle and being adapted to engage the peripheral bearing surface of said bottom wall in bearing relation, said second and third supports each including an upright shaft, means rotatably supporting said upright shafts on said lower wall, a bearing member on each said shaft and adapted to engage the peripheral bearing surface of said bottom wall, elongated tubular members rotatably supported on said upper wall, said shafts being slidably positioned in telescoping relation within said tubular members, a bearing member connected for rotation with each said tubular member, said bearing members engaging said top wall bearing surface in bearing relation, any pair of said adjacent supports being positioned substantially less than 180° apart whereby said matrix is supported against endwise displacement, and a pinion connected to rotate with one of said shafts, said pinion engaging said gear teeth in driving relation, and driving means for rotating said shaft to which said pinion is connected thereby rotating said matrix.

4. A heat regenerator comprising a casing including outer, upper and lower walls, a rotatable regenerator matrix disposed within said casing, said matrix including a cylindrical permeable member having annular top and bottom walls and outer and inner peripheral walls, first and second sealing assemblies within said casing, a transversely extending partition wall connected to said sealing assemblies to divide said casing into chambers, said assemblies including passages through which said matrix is moved during rotation from one chamber to another, said top and bottom walls of said matrix including axially extending peripheral bearing surfaces, a driven gear on said matrix, means supporting said matrix including a plurality of bearing elements mounted on said lower wall, said bearing elements including means engaging said bottom wall of said matrix; first, second, and third supports within said casing, said supports being positioned outwardly of said outer wall of said matrix, said first support including an upright spindle supported on the lower wall, a bearing member rotatably mounted on said spindle and being adapted to engage the peripheral bearing surface of said bottom wall in bearing relation, said second and third supports each including an upright shaft, means rotatably supporting said upright shafts on said lower wall, a bearing member on each said shaft and adapted to engage the peripheral bearing surface of said bottom wall, elongated tubular members rotatably supported on said upper wall, said shafts being slidably positioned in telescoping relation within said tubular members, a bearing member connected for rotation with each said tubular member, said bearing members engaging said top wall bearing surface in bearing relation, any pair of said adjacent supports being positioned substantially less than 180° apart whereby said matrix is supported against endwise displacement, and a pinion connected to rotate with one of the shafts, said pinion engaging said gear, and driving means for rotating said latter shaft thereby rotating said matrix.

5. A heat regenerator comprising a casing including outer, upper and lower walls, a rotatable regenerator matrix disposed within said casing, said matrix including a cylindrical member having annular top and bottom walls and outer and inner peripheral walls, first and second sealing assemblies within said casing, a transversely extending partition wall connected to said sealing assemblies to divide said casing into chambers, said assemblies including passages through which said matrix is moved during rotation from one chamber to another, said top and bottom walls of said matrix including peripheral bearing surfaces, means supporting said matrix including a plurality of bearing elements mounted on said lower wall, said bearing elements including means engaging said bottom wall of said matrix; first, second, and third supports within said casing, said supports being positioned outwardly of said outer wall of said matrix, said first support including an upright spindle supported on the lower wall, a bearing member rotatably mounted on said spindle and being adapted to engage the peripheral bearing surface of said bottom wall in bearing relation, said second and third supports each including an upright shaft, means rotatably supporting said upright shafts on said lower wall, a bearing member on each said shaft and adapted to engage the peripheral bearing surface of said bottom wall, elongated tubular members rotatably supported on said upper wall, said shafts being slidably positioned in telescoping relation within said tubular member, a bearing member connected for rotation with each said tubular member, said bearing member engaging said top wall bearing surface in bearing relation, any pair of said adjacent supports being positioned substantially less than 180° apart whereby said matrix is supported against endwise displacement, and rotating means connected to rotate with one of the shafts, said rotating means engaging said matrix, and driving means for rotating said latter shaft thereby rotating said matrix.

6. A heat regenerator comprising a casing including outer, upper and lower walls, a rotatable regenerator matrix disposed within said casing, said matrix including a cylindrical member having annular top and bottom walls and outer and inner peripheral walls, said top and bottom walls of said matrix including axially extending peripheral bearing surfaces, a partition within said casing, sealing assemblies connected to said partition and engaging said matrix to divide said casing into a plurality of chambers, means supporting said matrix including a plurality of bearing elements mounted on said lower wall, said bearing elements including means engaging said bottom wall of said matrix; first, second, and third supports within said casing, said first support including an upright spindle supported on the lower wall, a bearing member rotatably mounted on said spindle and being adapted to engage the peripheral bearing surface of said bottom wall in bearing relation, said second and third supports each including an upright shaft, means rotatably supporting said upright shafts on said lower wall, a bearing member on each said shaft and adapted to engage the peripheral bearing surface of said bottom wall, elongated tubular members rotatably supported on said upper wall, said shafts being slidably positioned in telescoping relation within said tubular members, a bearing member connected for rotation with each said tubular member, said bearing members engaging said top wall bearing surface in bearing relation, any pair of said adjacent supports being positioned substantially less than 180° apart whereby said matrix is supported against endwise displacement, and rotating means connected to rotate with one of the shafts, said rotating means engaging said matrix, and driving means for rotating one of said shafts thereby rotating said matrix.

References Cited in the file of this patent

UNITED STATES PATENTS

| | | |
|---|---|---|
| 2,807,447 | Vaughan | Sept. 24, 1957 |
| 2,836,398 | Linderoth | May 27, 1958 |
| 2,888,248 | Bubniak et al. | May 26, 1959 |
| 2,893,699 | Bubniak | July 7, 1959 |